United States Patent [19]

Kice

[11] Patent Number: 4,701,312

[45] Date of Patent: Oct. 20, 1987

[54] FLUIDIZED BED CATALYTIC CONVERTER

[76] Inventor: Warren B. Kice, 6318 Riverside La., Dallas, Tex. 75248

[21] Appl. No.: 682,498

[22] Filed: Dec. 18, 1984

Related U.S. Application Data

[62] Division of Ser. No. 426,891, Sep. 29, 1982, abandoned.

[51] Int. Cl.<sup>4</sup> ............................. F01N 3/15; B01J 8/18
[52] U.S. Cl. ................................. 423/213.7; 60/299; 422/141; 422/142; 422/171; 422/177
[58] Field of Search ............... 422/141, 142, 143, 171, 422/172, 177, 190; 60/299, 301, 305, 306; 423/213.7, 239 R, 245 S, 247, DIG. 16; 34/57 A

[56] References Cited

U.S. PATENT DOCUMENTS

| | | | |
|---|---|---|---|
| 2,216,763 | 10/1940 | Boyce | 422/177 X |
| 2,747,976 | 5/1956 | Houdry | 422/171 X |
| 2,772,147 | 11/1956 | Bowen et al. | 422/171 |
| 3,297,400 | 1/1967 | Eastwood | 422/171 |
| 3,607,104 | 9/1971 | Blickle et al. | 422/141 |
| 3,719,457 | 3/1973 | Nagamatso | 422/171 X |
| 3,771,969 | 11/1973 | Scheitlen | 422/171 |
| 3,976,597 | 8/1976 | Repik et al. | 34/57 A |
| 3,981,685 | 9/1976 | Fennessy | 60/299 X |
| 4,049,388 | 9/1977 | Scheitlen | 422/171 |
| 4,315,895 | 2/1982 | Bramer et al. | 422/171 |
| 4,338,283 | 7/1982 | Sakamoto et al. | 422/141 X |

FOREIGN PATENT DOCUMENTS 1088764  9/1960  Fed. Rep. of Germany ...... 422/177

OTHER PUBLICATIONS

Chemical Engineers' Handbook, Perry and Chilton, 5th Edition, pp. 20-64-20-74.
Research Disclosure, No. 138, Oct. 1975, 13810, p. S6191.

Primary Examiner—Barry S. Richman
Assistant Examiner—William R. Johnson
Attorney, Agent, or Firm—Warren B. Kice

[57] ABSTRACT

A catalytic converter in which exhaust gases to be treated are introduced into a housing containing a catalytic material. Air is introduced into the lower portion of the housing to fluidize the catalytic material and promote the reaction between the material and the exhaust gases to remove poisonous elements such as carbon monoxide, hydrocarbons and nitrogen oxides from the gases.

6 Claims, 2 Drawing Figures

FLUIDIZED BED CATALYTIC CONVERTER

This application is a division of application Ser. No. 426,891, filed Sept. 29, 1982, now abandoned.

BACKGROUND OF THE INVENTION

This invention relates to a catalytic converter for use in vehicles, and more particularly, to a catalytic converter including a fluidized bed of catalytic material for converting poisonous elements in the exhaust from the vehicle into harmless materials.

Catalytic converters are utilized on late model vehicles for the purposes of removing poisonous elements, including carbon monoxide, hydrocarbons and nitrogen oxides, from the exhaust gases of the internal combustion engines of the vehicles by converting the gases into harmless materials such as water, carbon dioxide and nitrogen. The converters are provided with a bed of catalytic material in pellet, or particulate, form which reacts with the exhaust gases as the latter pass through the material.

Late generation catalytic converters have utilized a dual bed arrangement in which one bed is disposed over the other. In these arrangements, the exhaust gases from the vehicle flow over and around a plurality of ceramic pellets in the upper chamber and then flow from the latter chamber, through a plurality of louvers, into a middle chamber where air from an engine driven pump pushes the gases through another set of louvers into a lower chamber. The lower chamber also contains pellets which are of a different composition than the upper chamber pellets and which are designed to convert any remaining hydrocarbon and carbon monoxide gases before they pass into atmosphere.

However, a major problem exists with the above arrangement, since the ceramic pellets in the upper chamber tend to split and fall through the upper louvers into the middle air chamber and plug up the lower louvers. This significantly retards exhaust gas flow and increases the exhaust system back pressure, resulting in a substantial loss of engine power.

SUMMARY OF THE INVENTION

It is therefore an object of the present invention to provide a catalytic converter of the above type which employs a fluidized bed of catalytic material.

It is a further object of the present invention to provide a catalytic converter that enjoys the advantages of the dual bed system yet eliminates the problem of plugging as discussed above.

It is a still further object of the present invention to provide a catalytic converter of the above type in which two in-line beds of catalytic material are provided at least one of which is fluidized.

Toward the fulfilment of these and other objects, the converter of the present invention includes a housing having an inlet at one end and an outlet at the other. The exhaust gases are introduced into the inlet and pass through a bed of catalytic material in the housing before discharging through the outlet. Air is introduced into the lower portion of the housing to fluidize the catalytic material and promote the reactions between the latter material and the exhaust gases to remove carbon monoxide, hydrocarbons and nitrogen oxides from the gases.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENTS

Figure 1:
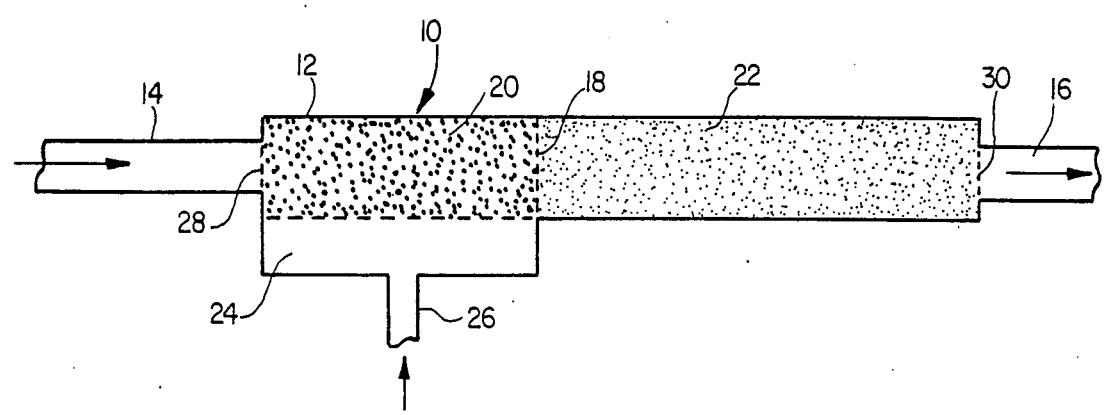
FIG. 1 is a schematic view of the catalytic converter of the present invention and FIG. 2 is a view similar to FIG. 1 but depicting an alternate embodiment of the present invention.

Referring to the embodiment of FIG. 1, the reference numeral 10 refers in general to a catalytic converter of the present invention which includes an elongated housing 12 connected at one end to an inlet pipe 14, and connected at its other end to a discharge pipe 16.

A vertical partition 18, in the form of a screen, or the like, is disposed approximately midway between the two end portions of the housing 12 and divides the housing into two chambers 20 and 22. A catalaytic material, in a pellet or particulate form, is provided in the chamber 20 and preferably is composed of ceramic pellets covered with platinum, palladium and rhodium, while a plurality of ceramic pellets covered with platinum and palladium are provided in the chamber 22. Since these pellets are conventional, they will not be described in any further detail.

The lower wall portion of the housing 12 defining the chamber 20 is perforated as shown, and an air plenum 24 extends below this wall portion and communicates with an air inlet pipe 26 for introducing air under pressure from a conventional engine-driven pump, or the like, into the plenum.

A screen 28 is provided at the juncture between the inlet pipe 14 and the housing 12 to prevent backflow of the ceramic pellets into the latter pipe, while a screen 30 is provided at the juncture between the discharge pipe 16 and the other end portion of the housing 12 to prevent ingress of the pellets from the chamber 22 into the latter pipe.

In operation, the exhaust gases from the vehicle are directed into the chamber 20 via the inlet pipe 14, and pressurized air is introduced, via the inlet pipe 26, into the air plenum 24. The latter air then passes up through the perforations in the lower wall portion of the housing 12 and into the chamber 20 where it fluidizes the pellets in the latter chamber.

As a result of this process, the catalytic pellets in the chamber 20 convert the poisonous carbon monoxide, hydrocarbon and nitrogen oxide gases into harmless materials, such as water, carbon dioxide and nitrogen and the remaining gases then pass from the chamber 20 through the screen partition 18 and into the chamber 22. The pellets in the chamber 22 function to convert any remaining hydrocarbon and carbon monoxide gases in the manner discussed above before the relatively clean gases discharge through the outlet pipe 16 into the atmosphere. It is understood that the amount of air introduced into the plenum 24 and therefore entering the chamber 20 can be regulated in a manner consistent with the above reactions and so that it is sufficient to properly fluidize the catalytic material.

As a result of the above, a relatively high heat transfer rate occurs between the hot exhaust gases and the pellets resulting in a maximum efficiency, a substantially uniform bed temperature and a minimum of corrosion, plugging, and fouling. Also, the perforations in the lower wall portion of the housing 12 and the partition 18 are substantially immune to plugging since pressurized air is introduced to the former and since the latter extends in a vertical direction.

Figure 2:
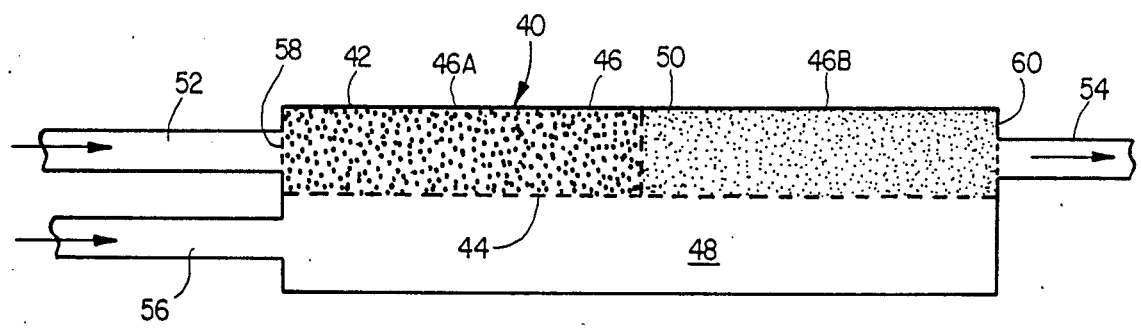

The catalytic converter according to the embodiment of FIG. 2, is shown by the reference numeral 40 and includes an elongated housing 42 having a horizontal perforated partition 44 extending for its length and approximately intermediate its upper and lower wall portions to define an upper chamber 46 and an lower chamber 48. A vertical partition 50, in the form of a screen, or the like, divides the upper chamber 46 into two chambers 46A and 46B.

An inlet pipe 52 communicates with one end of the chamber 46A for introducing exhaust gases into the latter chamber and a discharge pipe 54 communicates with the other end of the housing 42 for discharging the relatively clean gases into atmosphere. The lower chamber 48 receives pressurized air from an engine-driven pump, via an air inlet pipe 56, and the air passes upwardly in the housing 42 through the partition 44, and into the upper chambers 46A and 46B.

A catalytic material is provided in the chamber 46A and is identical to the material disposed in the chamber 20 of the previous embodiment, and a catalytic material is disposed in the chamber 46B which is identical to the material disposed in the chamber 22 of the previous embodiment.

A screen 58 is provided at the juncture between the inlet pipe 52 and the housing 42 and a screen 60 is provided at the juncture between the discharge pipe 54 and the housing for the purpose of retaining the catalytic material in the housing as discussed in connection with the previous embodiment.

In operation, the exhaust gases are admitted into the chamber 46A via the inlet pipe 52 and air is admitted, via the air inlet pipe 56, into the chamber 48. The air passes through the perforated partition 44 and into the chambers 46A and 46B to fluidized the catalytic material in both chambers. As a result, the carbon monoxide, hydrocarbons and nitrogen oxides in the exhaust gases are converted in the chamber 46A to water, carbon dioxide and nitrogen in the same manner discussed in the previous embodiment. The remaining gases then flow through the partition 50 into the chamber 46B where additional conversion of any carbon monoxide and hydrocarbons take place as also discussed above, before the gases are discharged, via the pipe 54, to atmosphere.

It is therefore seen that the embodiment of FIG. 2 enjoys the advantages of FIG. 1 in a system where both beds of catalytic material are fluidized.

It is understood that several variations can be made in the foregoing without departing from the scope of the invention. For example, two individual air plenums can be provided in association with the two catalyst-containing chambers, respectively, with each having a separate, individually regulated air supply. Also, a single catalyst-containing chamber can be provided which is fluidized by a single air plenum, or single air plenum can be provided in association with the chamber 22 of the embodiment of FIG. 1.

Still other modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed:

1. A two-stage method of catalytically converting exhaust gases from an internal combustion engine, comprising the steps of successively passing exhaust gases through two chambers respectively containing beds of catalytic material of different compositions selected to react with components in said exhaust gases to remove said components from said gases, and passing air through at least one of the said beds of catalytic material at a velocity to minimize plugging of catalytic material and to fluidize the catalytic material and promote a reaction between the catalytic material and said components.

2. The method of claim 1 wherein the catalytic material in each bed is selected to convert the carbon monoxide, hydrocarbon and nitrogen oxide gases in said exhaust gases into water, carbon dioxide and nitrogen.

3. The method of claim 1 in which said air is obtained by and passed through an engine-driven pump.

4. The method of claim 1 wherein said chambers are longitudinally spaced and said exhaust gases are passed longitudinally through said chambers.

5. The method of claim 4 wherein said air is passed laterally through at least one of said beds of catalytic material.

6. The method of claim 4 wherein said air is passed laterally through both of said beds of catalytic material.

* * * * *